US012602250B2

(12) United States Patent
Ramaswamy et al.

(10) Patent No.: US 12,602,250 B2
(45) Date of Patent: Apr. 14, 2026

(54) LCS RESOURCE DEVICE UTILIZATION SYSTEM

(71) Applicant: Dell Products L.P., Round Rock, TX (US)

(72) Inventors: Srikrishna Ramaswamy, Austin, TX (US); Glen Owen Sescila, III, Austin, TX (US); Andrew Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 740 days.

(21) Appl. No.: 17/866,485

(22) Filed: Jul. 16, 2022

(65) Prior Publication Data

US 2024/0020159 A1 Jan. 18, 2024

(51) Int. Cl.
*G06F 9/50* (2006.01)

(52) U.S. Cl.
CPC ................................. *G06F 9/5027* (2013.01)

(58) Field of Classification Search
CPC ......... G06F 9/5027; G06F 2009/45562; G06F 9/5005; G06F 2009/45579
See application file for complete search history.

(56) References Cited

U.S. PATENT DOCUMENTS

| | | | | |
|---|---|---|---|---|
| 10,664,282 B1 * | 5/2020 | Minkin | ...................... | G06F 9/52 |
| 11,403,150 B1 * | 8/2022 | Featonby | .............. | G06F 9/5077 |
| 2006/0168586 A1 * | 7/2006 | Stone | ...................... | G06F 9/485 |
| | | | | 718/104 |
| 2019/0332458 A1 * | 10/2019 | Kimura | .................. | G06F 9/5027 |
| 2019/0347125 A1 * | 11/2019 | Sankaran | .............. | G06F 9/3001 |
| 2020/0133892 A1 | 4/2020 | Bshara et al. | | |
| 2021/0200588 A1 * | 7/2021 | Reineke | .................. | G06F 16/21 |
| 2021/0382737 A1 * | 12/2021 | Cheng | ................. | G06F 9/45558 |
| 2022/0156211 A1 * | 5/2022 | Ooi | ..................... | G06F 15/7807 |
| 2023/0004508 A1 * | 1/2023 | Liu | .......................... | G06F 13/20 |
| 2023/0111884 A1 * | 4/2023 | Lu | .......................... | G06F 9/5077 |
| | | | | 718/1 |
| 2023/0214251 A1 * | 7/2023 | Jing | ...................... | G06F 9/5027 |
| | | | | 718/1 |

* cited by examiner

*Primary Examiner* — April Y Blair
*Assistant Examiner* — Kenneth P Tran
(74) *Attorney, Agent, or Firm* — Joseph Mencher

(57) ABSTRACT

An LCS resource device utilization system includes an orchestrator device coupled to a processing system, a memory system, and resource device. The orchestrator device receives an LCS provisioning instruction to provide an LCS using the resource devices and, in response, emulates respective hot plug events for an operating system provided for the LCS using the processing system and between emulated resource devices for the resource devices that are provided via the orchestrator device and respective emulated ports on emulated switch device(s) that are presented to the operating system. The orchestrator device then receives an LCS stop provisioning instruction to stop providing the LCS and, in response, emulates respective hot removal events for the operating system and between the emulated resource devices and the respective emulated ports on the emulated switch device(s) that are presented to the operating system.

20 Claims, 16 Drawing Sheets

800

ORCHESTRATOR DEVICE IDENTIFIES RESOURCE DEVICES
802

ORCHESTRATOR DEVICE PROGRAMS ORCHESTRATOR MEMORY SYSETEM WITH CONFIGURATION INFORMATION THAT PROVIDES EMULATED RESOURCE DEVICES FOR RESOURCE DEVICES
804

ORCHESTRATOR DEVICE PROGRAMS ORCHESTRATOR MEMORY SYSTEM TO PROVIDE EMULATED DEVICE CONTROLLERS FOR EMULATED RESOURCE DEVICES
806

ORCHESTRATOR DEVICE PRESENTS EMULATED SWITCH DEVICE(S) WITH EMULATED PORTS TO PROCESSING SYSTEM, AND EMULATES HOT PLUG EVENTS FOR OPERATING SYSTEM BETWEEN EMULATED RESOURCE DEVICES AND EMULATED PORTS ON EMULATED SWITCH DEVICE(S)
808

ORCHESTRATOR DEVICE RECEIVES INSTRUCTION TO STOP PROVIDING LCS USING SUBSET OF RESOURCE DEVICES
810

ORCHESTRATOR DEVICE EMULATES HOT REMOVAL EVENTS FOR OPERATING SYSTEM PROVIDED FOR LCS AND BETWEEN EMULATED RESOURCE DEVICES AND EMULATED PORTS ON EMULATED SWITCH DEVICE(S) PRESENTED TO THE OPERATING SYSTEM
812

302

RESOURCE
MANAGEMENT
SYSTEM
304

RESOURCE
SYSTEM
306a

RESOURCE
SYSTEM
306b

RESOURCE
SYSTEM
306c

LCS PROVISIONING SUBSYSTEM 300

402

SCP
DEVICE
406

RESOURCE
DEVICE
404a

RESOURCE
DEVICE
404b

RESOURCE
DEVICE
404c

RESOURCE SYSTEM 400

Figure 8:
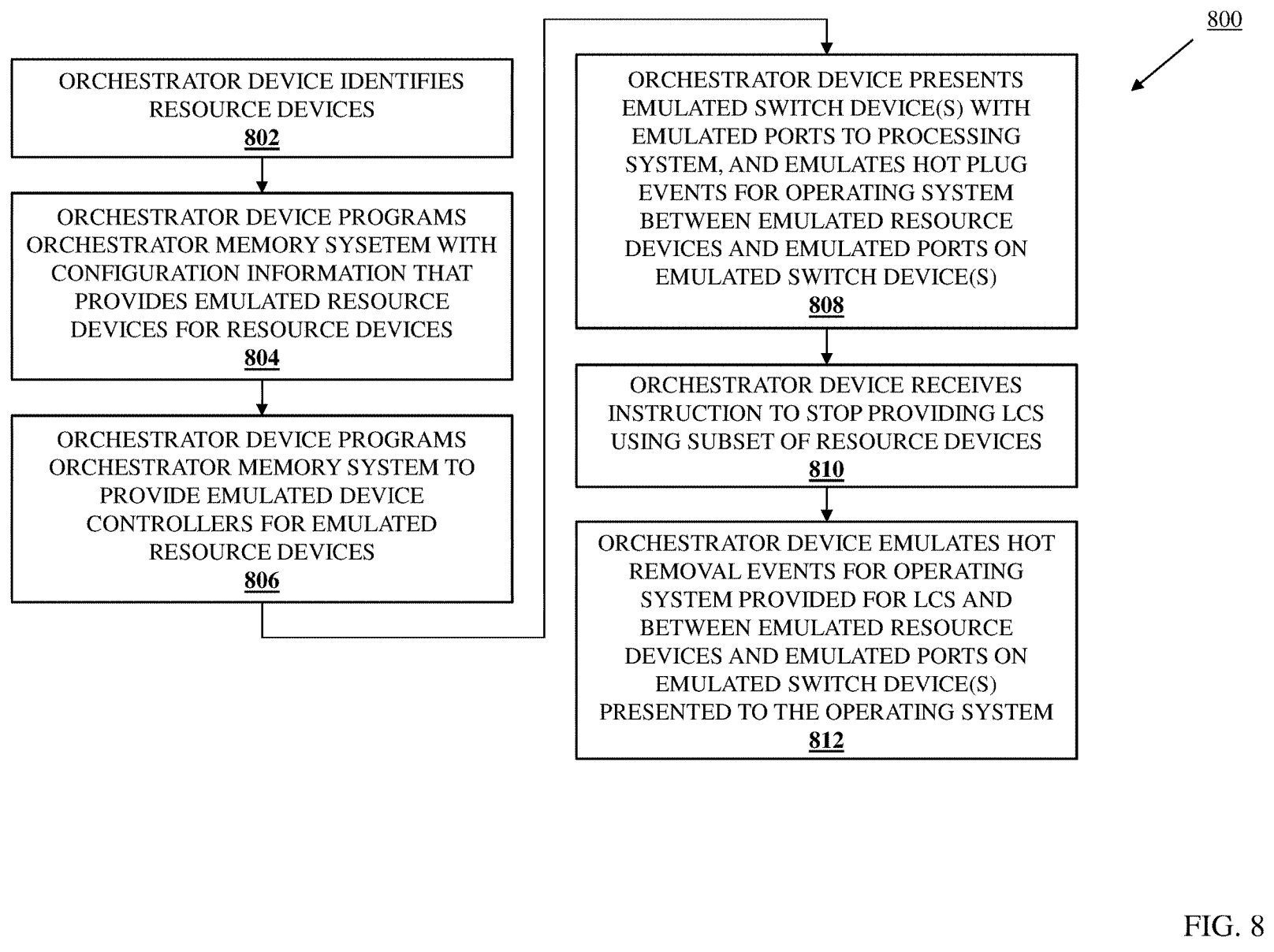

ORCHESTRATOR DEVICE IDENTIFIES RESOURCE DEVICES
802

ORCHESTRATOR DEVICE PROGRAMS ORCHESTRATOR MEMORY SYSETEM WITH CONFIGURATION INFORMATION THAT PROVIDES EMULATED RESOURCE DEVICES FOR RESOURCE DEVICES
804

ORCHESTRATOR DEVICE PROGRAMS ORCHESTRATOR MEMORY SYSTEM TO PROVIDE EMULATED DEVICE CONTROLLERS FOR EMULATED RESOURCE DEVICES
806

ORCHESTRATOR DEVICE PRESENTS EMULATED SWITCH DEVICE(S) WITH EMULATED PORTS TO PROCESSING SYSTEM, AND EMULATES HOT PLUG EVENTS FOR OPERATING SYSTEM BETWEEN EMULATED RESOURCE DEVICES AND EMULATED PORTS ON EMULATED SWITCH DEVICE(S)
808

ORCHESTRATOR DEVICE RECEIVES INSTRUCTION TO STOP PROVIDING LCS USING SUBSET OF RESOURCE DEVICES
810

ORCHESTRATOR DEVICE EMULATES HOT REMOVAL EVENTS FOR OPERATING SYSTEM PROVIDED FOR LCS AND BETWEEN EMULATED RESOURCE DEVICES AND EMULATED PORTS ON EMULATED SWITCH DEVICE(S) PRESENTED TO THE OPERATING SYSTEM
812

RESOURCE DEVICE(S) 718

RESOURCE DEVICE(S) 716

ORCHESTRATOR PROCESSING SYSTEM 704a

PCIE ENDPOINT CONNECTION 708

ORCHESTRATOR MEMORY SYSTEM 714

PCIE CONFIGURATION ENGINE 706a

FPGA DEVICE 706

PCIE TYPE 1 FUNCTION 710

ORCHESTRATOR DEVICE 704

BMS SYSTEM 701

712a

1300

BMS PROCESSING SYSTEM 712

702

RESOURCE DEVICE(S) 718

RESOURCE DEVICE(S) 716

ORCHESTRATOR PROCESSING SYSTEM 704a

PCIE ENDPOINT CONNECTION 708

1600

1600

PCIE CONFIGURATION ENGINE 706a

ORCHESTRATOR MEMORY SYSTEM 714

PCIE TYPE 1 FUNCTION 710

FPGA DEVICE 706

ORCHESTRATOR DEVICE 704

BMS SYSTEM 701

712a

BMS PROCESSING SYSTEM 712

702

LCS RESOURCE DEVICE UTILIZATION SYSTEM

BACKGROUND

The present disclosure relates generally to information handling systems, and more particularly to utilizing resource devices in an Logically Composed System (LCS) that is provided using an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, LCSs are often provided using Bare Metal Server (BMS) systems or other resource systems known in the art, with resource devices included within and/or outside of those resource systems (e.g., processing devices and memory devices on a motherboard in the BMS system used to provide an Operating System (OS) for the LCS, storage devices, networking devices, etc.) used to perform the functionality for the LCSs, and often dynamically changing over the time period in which the LCS is provided. In such examples, the resource devices available to the BMS system to provide the LCS must be presented to the BMS processing system (e.g., a x86 processor) in order to allow their utilization in providing the LCS, but the presentation and utilization of resource devices in such a manner raises some issues. For example, conventional systems like the server devices discussed above would operate to present their devices as Peripheral Component Interconnect express (PCIe) functions to their processor in order to allow that processor to utilize those PCIe functions. However, such conventional PCIe device presentation and utilization is implemented in hardware (e.g., using an Application Specific Integrated Circuit (ASIC)), and requires a predefined, dedicated portion of that hardware for each PCIe function that is presented and utilized. As will be appreciated by one of skill in the art in possession of the present disclosure, the conventional PCIe device presentation and utilization techniques discussed above will have significant difficulties dynamically scaling with the large number of PCIe functions required to be presented by a BMS system that may support a relatively large number of LCSs, and will require relatively large/expensive ASICs that are pre-programmed to support every PCIe function that might be needed by an LCS.

Accordingly, it would be desirable to provide a device presentation and utilization system that addresses the issues discussed above.

SUMMARY

According to one embodiment, an Information Handling System (IHS) includes an orchestrator processing system; and an orchestrator memory system that is coupled to the orchestrator processing system and that includes instructions that, when executed by the orchestrator processing system, cause the orchestrator processing system to provide an orchestrator engine that is configured to: receive a Logically Composed System (LCS) provisioning instruction to provide an LCS using a subset of a plurality of resource devices; emulate, for each of the subset of the plurality of resource devices in response to receiving the LCS provisioning instruction, a respective hot plug event for an operating system provided for the LCS using a host processing system and between an emulated resource device for that resource device that is provided via a orchestrator memory system and a respective emulated port on at least one emulated switch device that is presented to the operating system; receive an LCS stop provisioning instruction to stop providing the LCS; and emulate, for each of the subset of the plurality of resource devices in response to receiving the LCS stop provisioning instruction, a respective hot removal event for the operating system provided for the LCS using the host processing system and between the emulated resource device for that resource device that is provided via the orchestrator memory system and the respective emulated port on the at least one emulated switch device that is presented to the operating system.

BRIEF DESCRIPTION OF THE DRAWINGS

FIG. 8 is a flow chart illustrating an embodiment of a method for presenting and utilizing resource devices with an LCS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
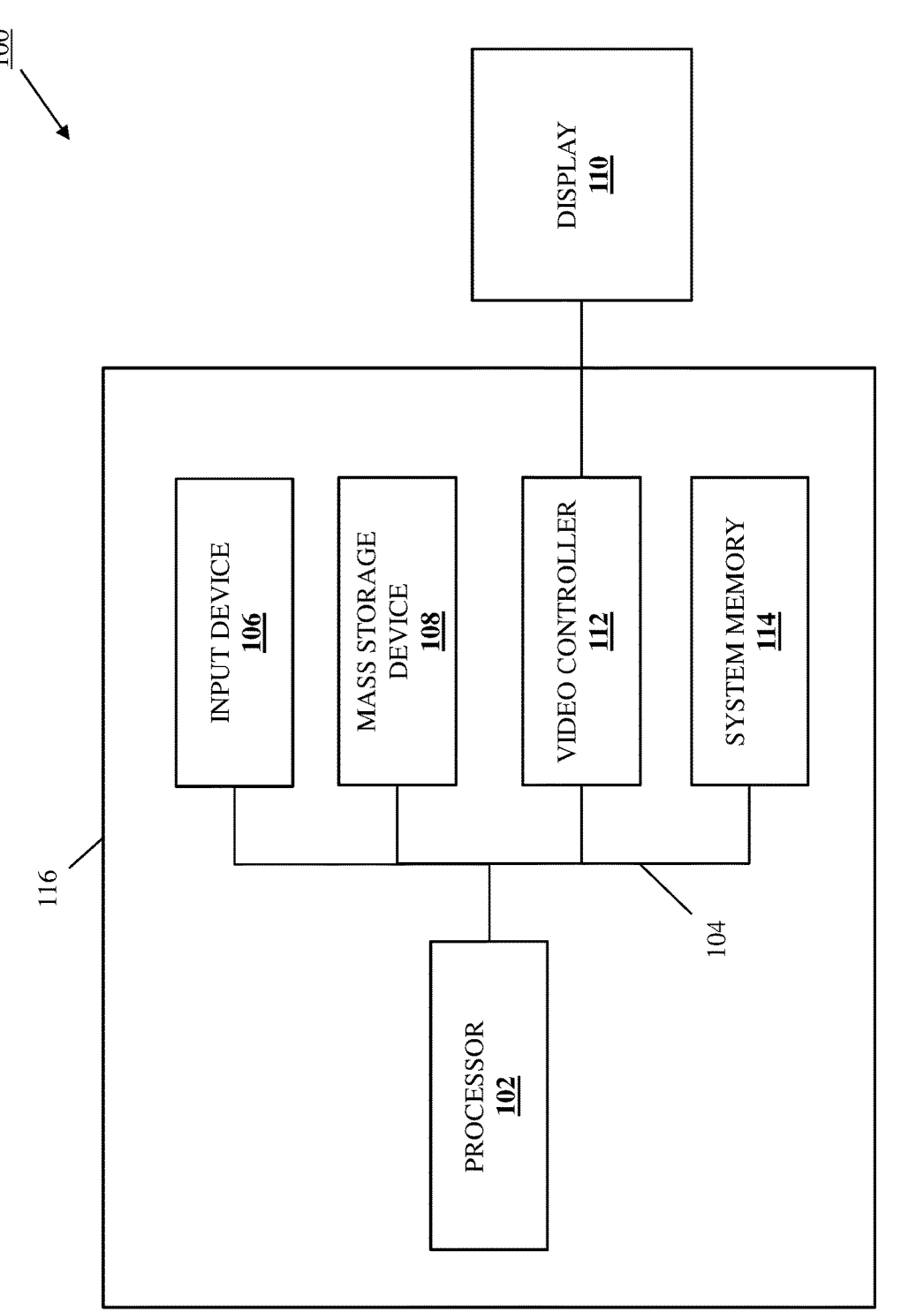
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) presentation and utilization systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
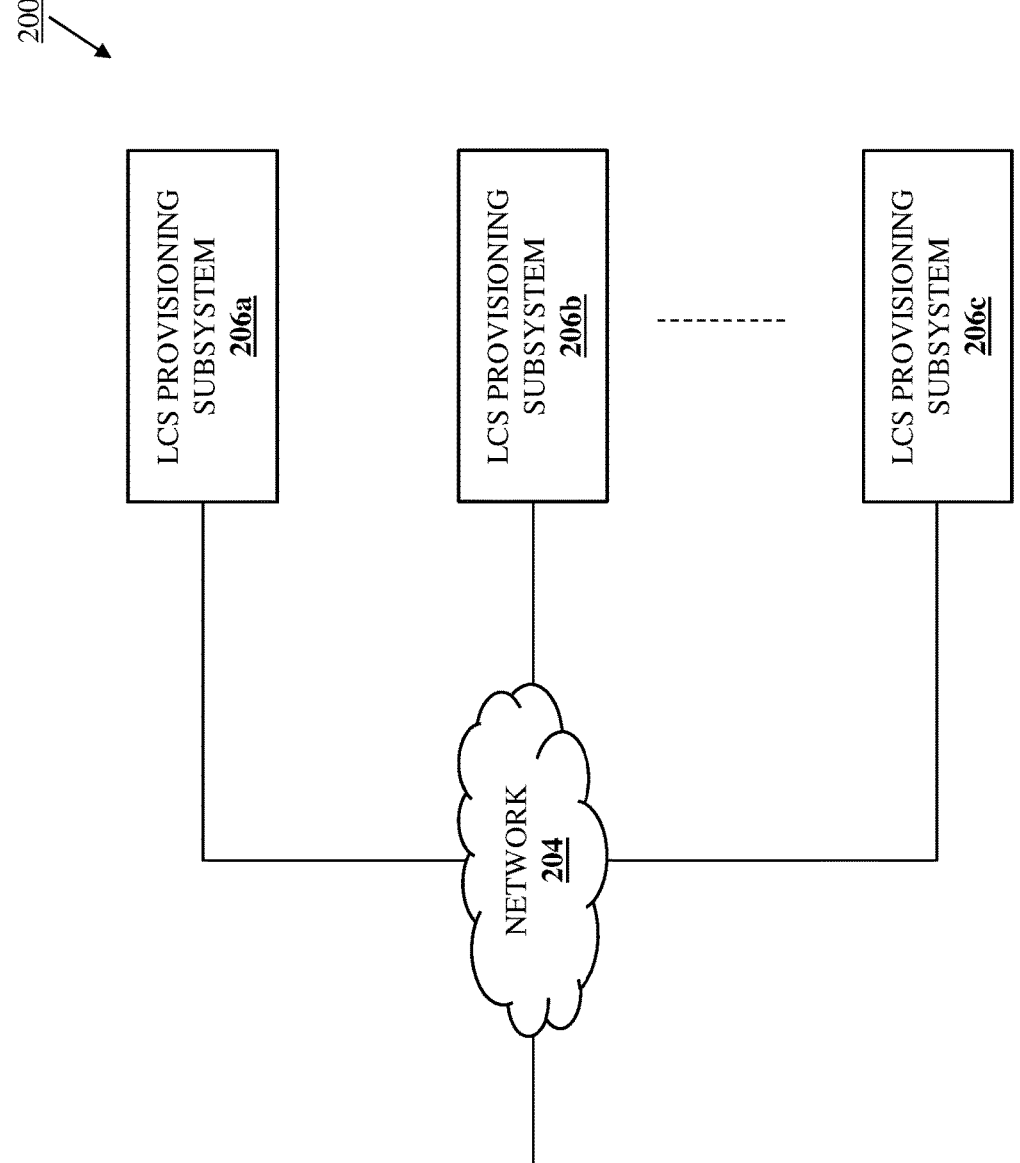
FIG. 2 is a schematic view illustrating an embodiment of an LCS provisioning system.

With reference to FIG. 2, an embodiment of an LCS provisioning system 200 is illustrated that may be utilized with the LCS presentation and utilization systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include an orchestrator device. In some embodiments, the orchestrator device may be provided by the System Control Processor (SCP) device or Data Processing Unit (DPU) device discussed below, and may be conceptualized as an "enhanced" SmartNIC device that may be configured to perform functionality that is not available in conventional SmartNIC devices such as, for example, the resource management functionality, LCS provisioning functionality, and/or other SCP/DPU functionality described herein. However, while described as being provided by an SCP device or DPU device, one of skill in the art in possession of the present disclosure will appreciate how the orchestrator device of the present disclosure may also be provided by a multi-core processing system (e.g., an ARM processing system) that has been configured to perform the orchestrator functionality described below while remaining within the scope of the present disclosure as well.

In an embodiment, any of the resource systems 306a-306c may include any of the resources described below coupled to an SCP device or DPU device that is configured to facilitate management of those resources by the resource management system 304. Furthermore, the SCP device or DPU device included in the resource management system 304 may provide an SCP Manager (SCPM) subsystem or DPU Manager (DPUM) subsystem that is configured to manage the SCP devices or DPU devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem or DPUM subsystem discussed below may be provided by a dedicated SCP device, DPU device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem or DPUM subsystem may be provided by an SCP device, DPU device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices or DPU devices in the resource systems 306a-306c may operate to "elect" or otherwise select one or more of those SCP devices or DPU devices to operate as the SCPM subsystem or DPUM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406, but one of skill in the art in possession of the present disclosure will appreciate how the SCP device 406 may be replaced by the DPU device described herein while remaining within the scope of the present disclosure, with that DPU device provided by BLUEFIELD® DPU devices available from NVIDIA® Corporation of Santa Clara, California, United States, DPU devices available from FUNGIBLE® Inc. of Santa Clara, California, United States, and/or other DPU devices known in the art.

In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may provide a "trusted" orchestrator device that operates as a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. For example, the SCP device 406 may be "trusted" because it provides a root-of-trust for its corresponding resource devices/systems, and thus may be configured with restricted access to its hardware and/or software that has been validated and is maintained within a closed-loop infrastructure. For example, the SCP device 406 may run cryptographically signed software validated via the root-of-trust, with connectivity to both a BMS BMC and the SCPM device discussed above, and with all communications internal to the closed-loop infrastructure secured to ensure their veracity.

To contrast, the DPU device described herein may provide an "untrusted" orchestrator device that may include similar hardware/software/capabilities as the SCP device 406, but a user of the SCP device 406 may not be able to access such hardware/software/capabilities on the SCP device 406 unless it is part of/connected to an authorized network. As will be appreciated by one of skill in the art in possession of the present disclosure, the DPU device may be "untrusted" due to it having not been manufactured by a manufacturer of the computing system (e.g., it may be obtained by the manufacturer of the computing system from any of a variety of vendors that are not controlled by the manufacturer of the computing system), it having not been secured based on a lack of control over the DPU device by a manufacturer of the computing system, and/or based on other "untrusted" factors that would be apparent to one of skill in the art in possession of the present disclosure. As will be appreciated by one of skill in the art in possession of the present disclosure, a DPU device software stack differs from a conventional Input/Output (IO) card that uses firmware configured to provide dedicated I/O and management functions, as in addition to firmware, the DPU device software stack will include a DPU operating system and a user space that is customizable to configure/program the DPU device to present resource devices to an operating system in the computing system outside the control of the manufacturer of the computing system, which can render that DPU device "untrusted" in many scenarios.

As discussed below, the SCP devices and/or DPU devices described herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on the DPU devices discussed above, as well as other devices with similar functionality, while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
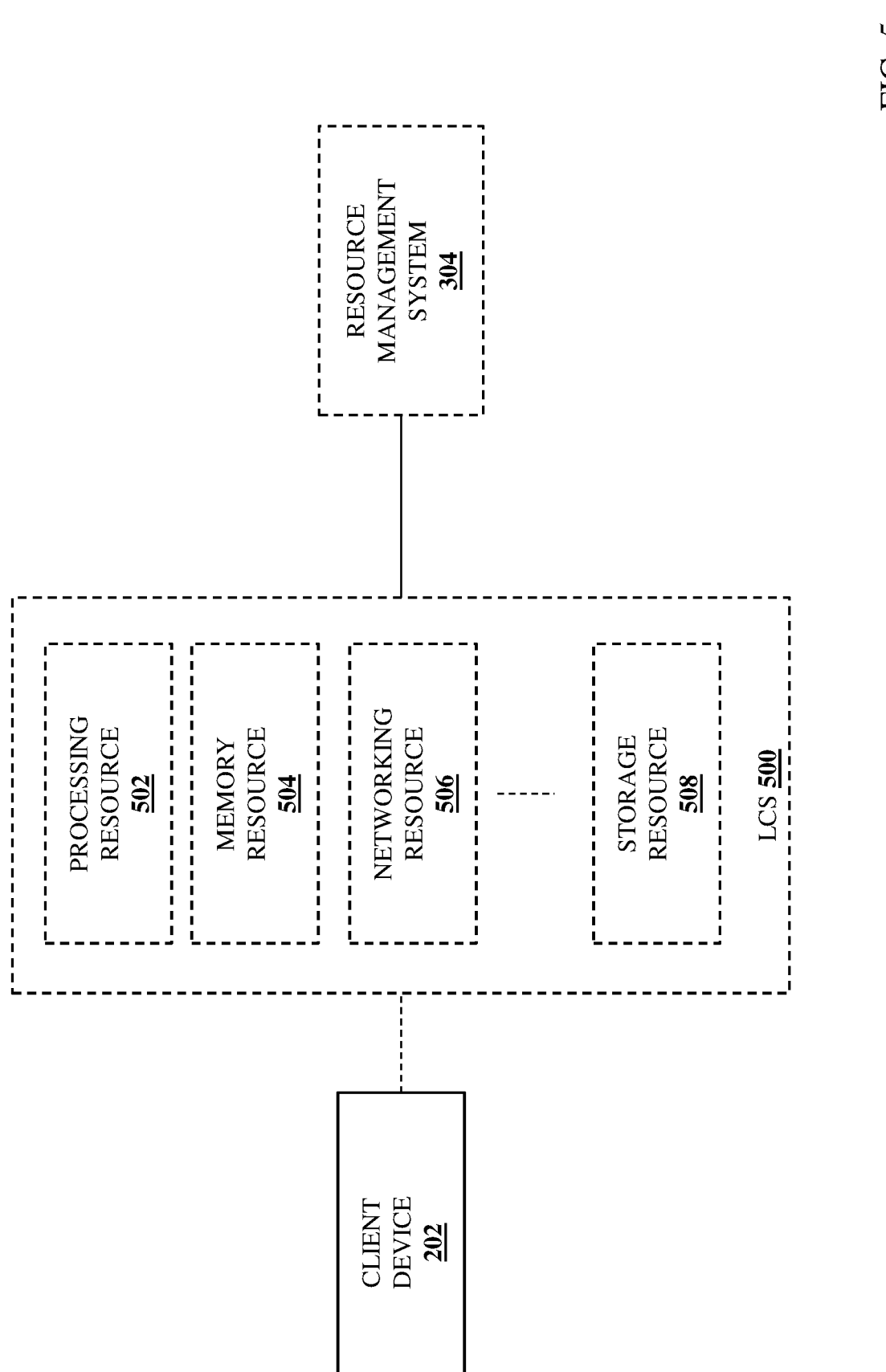
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TB s of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TB s of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/ storage functionality may be provided for the networking resources 506 and storage resources 508, if needed.

Figure 6:
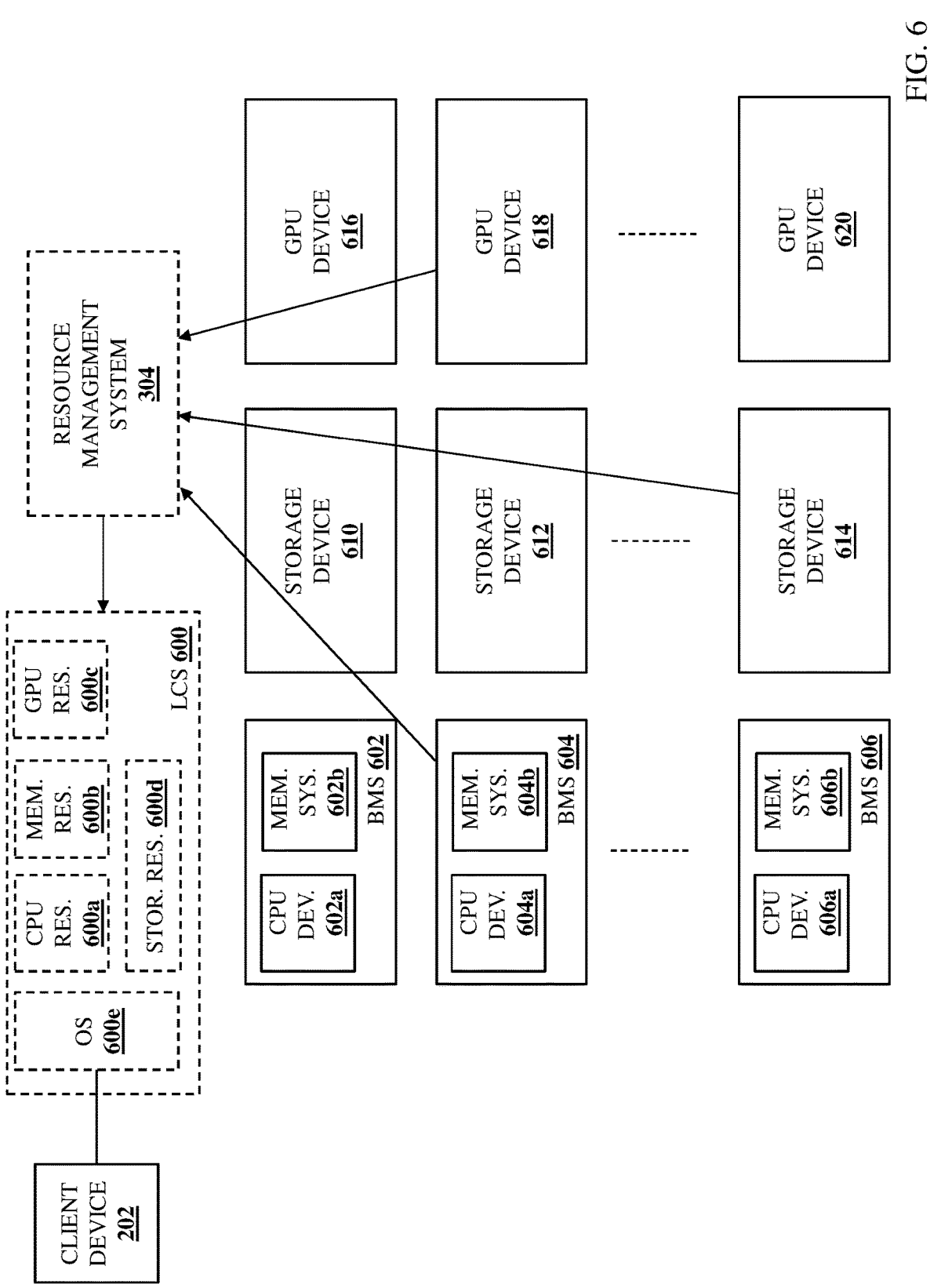
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 618 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/ CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 600.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/ time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. In one example, the resource management system and/or orchestrator device may maintain the resource communication information discussed above for the LCS, with the orchestrator device presenting the LCS to the client device and allowing the client device to transmit and receive information with the LCS without knowledge of that resource communication information that is used to communication with the resource devices that provide the functionality for that LCS. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
FIG. 7 is a schematic view illustrating an embodiment of an LCS resource device presentation and utilization system provided according to the teachings of the present disclosure.

Referring now to FIG. 7, an embodiment of a LCS resource device presentation and utilization system 200 that may be provided according to the teachings of the present disclosure is illustrated. In the illustrated embodiment, the LCS resource device presentation and utilization system 200 includes a BMS system 701 that may be provided by any of the resource systems 306a-306c and 400, or the BMS systems 602-606, discussed above. In the illustrated embodiment, the BMS system 701 includes a chassis 702 that houses the components of the BMS system 701, only some of which are illustrated and discussed below. For example, the chassis 702 may house an orchestrator device 704 that may be provided by the SCP devices or the DPU devices discussed above. In the illustrated embodiment, the orchestrator device 704 includes an orchestrator processing system 704a that, as discussed above, may provide the SCP engine in the SCP device discussed above, or the DPU engine in the DPU device discussed above. However, as also discussed above, the orchestrator processing system 704a may be provided by a multi-core processing system (e.g., an ARM processing system) that is configured to perform the functionality of the orchestrator device 704 discussed below.

In the illustrated embodiment, the orchestrator device 704 includes a Field Programmable Gate Array (FPGA) device 706 that, as discussed below, operates to perform at least some of the functionality described for the orchestrator device 704. However, while illustrated and described as an FPGA device, one of skill in the art in possession of the present disclosure will appreciate how the FPGA device 706 may be replace by an Application Specific Integrated Circuit (ASIC) and/or other processors while remaining within the scope of the present disclosure. Furthermore, while the FPGA device 706 is illustrated as part of the orchestrator device 704 (e.g., included on a circuit board provided for the SCP device or DPU device discussed above), one of skill in the art in possession of the present disclosure will appreciate how the FPGA device 706 may be separate from the orchestrator device 704 (e.g., the FPGA device 706 may be provided by a resource device included within or outside of the chassis 702 of the BMS system 701) while being "bound" to the orchestrator device 704 in order to provide the orchestrator device functionality described below. As such, some embodiments of the present disclosure may provide the orchestrator processing system 704a and the FPGA device 706 as a single logical entity that enables the functionality described below. However, while illustrated and described as including the FPGA device 706, one of skill in the art in possession of the present disclosure will appreciate how the orchestrator processing system 704a may be configured to perform the functionality described below as being performed by the FPGA device 706, thus allowing the FPGA device 706 illustrated in FIG. 7 to be omitted.

In the illustrated embodiment, the FPGA device 706 may include an FPGA processing system that is coupled to an FPGA memory system that includes instructions that, when executed by the FPGA processing system, cause the FPGA processing system to provide a Peripheral Component Interconnect express (PCIe) configuration engine 706a that is configured to perform the emulation functionality described as being performed by the PCIe configuration engines and/or FPGA devices discussed below. In the illustrated embodiment, the FPGA includes a PCIe endpoint connection 708 that is coupled to the PCIe configuration engine 706a (e.g., via a coupling between the PCIe endpoint connection 708 and the FPGA processing system), and a PCIe type 1 function 710 that is coupled to the PCIe configuration engine 706a (e.g., via a coupling between the PCIe type 1 function 710 and the FPGA processing system). However, while described as including PCIe endpoint connections and type 1 functions and performing PCIe configuration operations, one of skill in the art in possession of the present disclosure will appreciate how the FPGA device 706 may include connection technologies other than PCIe, and may perform the configuration operations below using those other connection technologies while remaining within the scope of the present disclosure as well.

As illustrated, the orchestrator processing system 704a is coupled to the PCIe endpoint connection 708 in the FPGA device 706, and one of skill in the art in possession of the present disclosure will appreciate how the PCIe endpoint connection 708 allows the FPGA device 706 to present itself to the orchestrator processing system 704a as a PCIe endpoint. Furthermore, a BMS processing system 712 in the BMS system 701 is coupled to the PCIe type 1 function 710 in the FPGA device 706 via a root port 712a in the BMS processing system 712, and one of skill in the art in possession of the present disclosure will appreciate how the PCIe type 1 function 710 allows the FPGA device 706 to present the BMS processing system 712 with the emulated switch device(s) or bridge(s) discussed below. For example, as discussed above, the BMS processing system 712 may be provided by a CPU in the BMS system 701 that may operate to provide an operating system for an LCS provided by the BMS system 701, and thus the PCIe configuration engine 706a in the FPGA device 706 may present the BMS processing system 712 and/or the operating system it provides with emulated switch device(s) or bridge(s) via the PCIe type 1 function 710, which as discussed below allows a plurality of emulated resource devices/PCIe functions to be presented to the BMS processing system 712 and/or the operating system it provides as being coupled to emulated ports on the emulated switch device(s) or bridge(s). As will be appreciated by one of skill in the art in possession of the present disclosure, conventional systems such as those including the ASICs discussed above utilize a PCIe type 0 connection, which limits the number of PCIe functions that may be presented to a connected processing system, and as discussed below the use of the PCIe type 1 function 710 and its bridge/switch functionality described herein practically eliminates that limitation by allowing a hierarchy of PCIe functions to be presented via a hierarchy of emulated switch devices up to the limits of available memory systems.

In the illustrated embodiment, an orchestrator memory system 714 is included orchestrator device 704, and may include Static Random Access Memory (SRAM) memory devices, Dual Data Rate (DDR) memory devices, and/or any other memory devices that would be apparent to one of skill in the art in possession of the present disclosure. In the illustrated embodiment, the orchestrator memory system 714 is coupled to each of the PCIe configuration engine 706a in the FGPA device 706 (e.g., via a coupling between the memory system 714 and the FPGA processing system), as well as to the orchestrator processing system 704a. However, while not illustrated in detail, one of skill in the art in possession of the present disclosure will appreciate how the memory system 714 may include separate memory device(s) coupled to the PCIe configuration engine 706a in the FGPA device 706, and separate memory device(s) coupled to the orchestrator processing system 704a. As such, while illustrated and described as a single memory system, one of skill in the art in possession of the present disclosure will appreciate how the memory system 714 illustrated in FIG. 7 may represent separate memory subsystems connected to each of the PCIe configuration engine 706a in the FGPA device 706 (e.g., an FPGA-dedicated SRAM/DDR memory subsystem) and the orchestrator processing system 704a (e.g., an orchestrator-processing-system-dedicated SRAM/DDR memory subsystem), respectively.

In the illustrated embodiment, the chassis 702 of the BMS system 701 includes one or more resource devices 716 that are coupled to the orchestrator processing system 704a. Furthermore, FIG. 7 also illustrates how the orchestrator processing system 704a may be coupled (e.g., via a network) to one or more resource devices 718 that are located outside the chassis 702 of the BMS system 701. Thus, FIG. 7 illustrates how the orchestrator processing system 704a/orchestrator device 704 may be coupled to a plurality of resource devices 716 and 718 located both inside and outside of the chassis 702 of the BMS system 701, and as discussed above the orchestrator device 704 may be configured to utilize any of the resource devices 716 and 718 to provide an LCS for a client device. However, while a specific LCS resource device presentation and utilization system 700 has been illustrated, one of skill in the art in possession of the present disclosure in the art in possession of the present disclosure will recognize that the LCS resource device presentation and utilization system of the present disclosure may include a variety of components and/or component configurations for providing conventional LCS provisioning functionality, as well as the functionality discussed below, while remaining within the scope of the present disclosure as well.

Referring now to FIG. 8, an embodiment of a method 800 for presenting resource devices for utilization with a Logically Composed System (LCS) is illustrated. As discussed below, the systems and methods of the present disclosure provide a software/hardware architecture that provides an LCS by programming an orchestrator memory system in an orchestrator device to emulate resource devices and their corresponding device controllers that will be used by that LCS. Those emulated resource devices are then presented by the orchestrator device to a host processing system as PCIe functions connected to emulated ports on emulated switch device(s) via emulated hot plug events to an operating system for that LCS that is provided by the processing system, with those emulated hot-plug events occurring between the emulated resource devices for that subset of resource device and their respective emulated ports on the emulated switch device(s) in order to allow the operating system to utilize the subset of resource devices in order to perform operations for the LCS. When the LCS is subsequently de-composed, the orchestrator device may then emulate hot removal events to that operating system and between the emulated resource devices for the subset of resource device and their respective emulated ports on the emulated switch device(s). As such, emulated resource devices may be created and presented to a processing system for any resource device available to an orchestrator device, and then utilized by an operating system provided by that processing system for an LCS, without a need to dedicate hardware for each PCIe function representing those resource devices.

The inventors of the present disclosure have recognized that scalable systems and methods for presenting and utilizing the relatively large and changing numbers and types of resource devices as PCIe functions will greatly facilitate the providing of LCSs discussed above. As also discussed above, conventional systems support a limited number of predefined PCIe functions via dedicated hardware (e.g., portions of an ASIC), and thus any scalability in such conventional systems will rely on the roadmap and timelines of the ASIC/hardware vendor. To address these issues, the inventors of the present disclosure have developed the software/hardware architecture described herein to present resource devices as PCIe virtual functions, as well as to allow for the utilization of those resource devices via their presented PCIe virtual functions, without the need for dedicated hardware other than a memory system that is used for emulating the resource devices and their device controllers.

As discussed below, such resource device presentation and utilization functionality may be enabled by a hardware-based standalone PCIe function presentation/enumeration process that utilizes a PCIe type 1 function to allow the emulation of switch device(s)/bridge(s) that provide for the coupling of a relatively large number of PCIe functions to a BMS processing system and an operating system it provides, with the number of PCIe virtual functions limited only by the amount of memory space that is available to provide their corresponding emulated resource devices (one of skill in the art in possession of the present disclosure will recognize that while the PCIe protocol has an upper limit on function count, that limit is orders of magnitude higher than the predefined ASIC functions discussed above, making the PCIe virtual function limit for the purposes of this disclosure a (practical) function of the memory space). The resource device presentation and utilization functionality may also be enabled by the software-based creation/destruction of emulated device controllers bound to the emulated resource devices/PCIe virtual functions, thus allowing the utilization of any of the resource devices presented as discussed above.

As also discussed in further detail below, the resource device presentation and utilization functionality of the present disclosure allows an orchestrator device to dynamically connect emulated resource devices presented as PCIe functions to an operating system provided for an LCS via the emulation of hot plug events for the operating system and between emulated ports on emulated switch device(s) and the emulated resource devices, and dynamically disconnect emulated resource devices presented as the PCIe functions from the operating system provided for the LCS via the emulation of hot removal events for the operating system and between the emulated ports on emulated switch device(s) and the emulated resource devices. As such, the presentation of resource devices to a host processing system in a BMS system and the utilization of those resource devices by an operating system provided by that processing system for the LCS may be software-based and may scale practically infinitely as it may only be limited by the amount of available memory in memory system hardware. One of skill in the art in possession of the present disclosure will appreciate how the dynamic adding and removing of the emulated devices discussed below allows for the creation ("spinning up") and removal ("tearing down") of LCSs without the need to disturb other LCSs that may be provided using the same system or subsystems.

Figure 9:
FIG. 9 is a schematic view illustrating an embodiment of the LCS resource device presentation and utilization system of FIG. 7 operating during the method of FIG. 8.

The method 800 begins at block 802 where an orchestrator device identifies resource devices. With reference to FIG. 9, in an embodiment of block 802, the orchestrator processing system 704a in the orchestrator device 704 may perform resource device identification operations 900 that include identifying the resource devices 716 that are included in the chassis 702 of the BMS system 701, and identifying the resource devices 718 that are included outside of the chassis 702 of the BMS system 701. As discussed above, the orchestrator device 704 may be coupled to a variety of resource devices, and may have those resource devices identified to it by the resource management system 304 discussed above (e.g., as part of the composing of an LCS), and/or may utilize any of a variety of techniques known in the art to identify those resource devices at block 802. For example, the orchestrator device 704 may identify the resource devices at block 802 by receiving an instruction to provide an LCS using those resource devices from the resource management system 304 (e.g., an SCPM device). As discussed above, the resource management system 304 may receive a workload intent from the client device 202 and, in response, may compose an LCS using any subset of the resource devices 716 and 718 available to the orchestrator device 704/orchestrator processing system 704a, and then may generate and transmit an LCS provisioning instruction that instructs the orchestrator processing system 704a to provide an LCS using that subset of the resource devices 716 and 718.

FIG. 9 also illustrates how the orchestrator processing system 704a may perform resource device reporting operations 902 that include reporting any of the resource devices 716 and 718 that were identified to the PCIe configuration engine 706a in the FPGA device 706 via the PCIe endpoint connection 708. As such, following block 802 the orchestrator processing system 704a and/or other PCIe configuration engine 706a in the FPGA device 706 may have identified each of the resource devices 716 and 718 that are available to the orchestrator device 704 and that will be used to provide the LCS. However, while both the orchestrator processing system 704a and/or other PCIe configuration engine 706a in the FPGA device 706 are illustrated and described as identifying the resource devices 716 and 718 at block 802, one of skill in the art in possession of the present disclosure will appreciate how only the orchestrator processing system 704a may identify the resource devices 716 and 718 while remaining within the scope of the present disclosure as well.

Figure 10:
FIG. 10 is a schematic view illustrating an embodiment of the LCS resource device presentation and utilization system of FIG. 7 operating during the method of FIG. 8.

The method 800 then proceeds to block 804 where the orchestrator device programs an orchestrator memory system with configuration information that provides emulated resource devices for the resource devices. With reference to FIG. 10, in an embodiment of block 804, the orchestrator processing system 704a and/or the PCIe configuration engine 706a may perform orchestrator memory system programming operations 1000 that may include programming the orchestrator memory system 714 with configuration information for the resource devices 716 and 718 that provides emulated resource devices for those resource devices 716 and 718. For example, the orchestrator memory system programming operations 1000 may include programming the orchestrator memory system 714 with PCIe configuration information such as device configuration register information, Memory Mapped Input/Output (MMIO) register information, control register information, capability information, and/or any other configuration information for each of the resource devices 716 and 718 that one of skill in the art in possession of the present disclosure will appreciate as allowing for the emulation of the resource devices 716 and 718 discussed below. In an embodiment, the emulated resource devices may be provided by PCIe functions (e.g., PCIe physical or virtual functions), and the programming of the orchestrator memory system 714 at block 804 may include mapping the programmed configuration information (e.g., the MMIO register information and/or other configuration information detailed above) for an emulated resource device/PCIe function to the BMS processing system 712. As will be appreciated by one of skill in the art in possession of the present disclosure, the presentation of PCIe functions in such a manner does not require dedicated hardware resource (e.g., the ASIC resources discussed above), allowing the corresponding the presentation of resource devices/PCIe functions to the BMS processing system 712 to be handled using the memory system 714.

As will be appreciated by one of skill in the art in possession of the present disclosure, PCIe systems may include a configuration space and a memory space. Furthermore, registers in the configuration space are defined by PCIe specifications such that they are consistent between all devices from all vendors, with conventional system software such as a Basic Input/Output System (BIOS), a hypervisor, and an operating system using registers in the configuration space for device discovery and/or enumeration and the programming of system resource allocations (e.g., base addresses in the memory space for Memory-Mapped Input/Output (MMIO), interrupt vectors, etc.). Further still, registers in the memory space are device-specific and may be used by device drivers to utilize those devices during operations (as opposed to device discovery). In an embodiment, the orchestrator device of the present disclosure may emulate registers in the configuration space for each function so that system level software such as the operating system discussed above can discover the presented devices and assign system level resources such as the base addresses and interrupt vectors discussed above. Furthermore, the emulated configuration space may also be used for the hot plug emulation and hot removal emulation described below. The orchestrator device of the present disclosure may also emulate registers in the memory space for each function so that the actual operations of the device may be emulated for the associated device driver. In addition, the orchestrator device may emulate Direct Memory Access (DMA) data transfers to and from the BMS system, interrupts to the BMS system for each presented function (as necessary during operations), as well as any other operations that would be apparent to one of skill in the art in possession of the present disclosure.

As such, the orchestrator memory system 714 may be used to store the contents of configuration space registers, memory space registers, and/or any other state information necessary for each function (e.g., the mapping to back-end device resources (such as the resource devices 716 and 718) for each presented function). For example, an emulated NVMe storage device presented to an LCS may be backed by actual non-volatile storage resources from a set of (or a portion of an) physical NVMe storage device(s), and the physical NVMe storage device(s) might be located across a network, so information such as Internet Protocol (IP) addresses or Transmission Control Protocol/Internet Protocol (TCP/IP) session information may be stored in the memory system 714, while information describing the hierarchy of emulated switch devices and the configuration registers of those switch devices and their ports may be stored in the memory system 714 as well.

The method 800 then proceeds to block 806 where the orchestrator device programs the orchestrator memory system to provide emulated device controllers for the emulated resource devices. With reference back to FIG. 10, in an embodiment of block 806, the orchestrator memory system programming operations 1000 performed by the orchestrator processing system 704a and/or the PCIe configuration engine 706a in the FPGA device 704 may include programming the orchestrator memory system 714 to provide emulated device controllers for the emulated resource devices that are provided for the resource devices 716 and 718 at block 804. For example, the memory system programming operations 1000 may include programming the orchestrator memory system 714 with PCIe configuration information such as device controller configuration register information, Memory Mapped Input/Output (MMIO) register information, control register information, capability information, and/or any other configuration information that one of skill in the art in possession of the present disclosure will appreciate as allowing for the emulation of the device controllers for the emulated resource devices discussed below. However, while both the orchestrator processing system 704a and/or other PCIe configuration engine 706a in the FPGA device 706 are illustrated and described as programming the orchestrator memory system 714 at blocks 804 and 806, one of skill in the art in possession of the present disclosure will appreciate how only the orchestrator processing system may program the orchestrator memory system 714 at blocks 804 and 806 while remaining within the scope of the present disclosure as well.

To provide a specific example of blocks 804 and 806, the emulated resource devices provided via block 804 may include emulated RAID storage devices, while the emulated device controllers provided via block 806 may be a RAID controller for those RAID storage devices. However, one of skill in the art in possession of the present disclosure will appreciate how both the emulated resource devices and the emulated device controllers both appear as PCIE devices, and in some embodiments the emulation of only resource devices (i.e., without associated device controllers) will fall within the scope of the present disclosure as well.

Thus, blocks 804 and 806 of the method 800 may allow the orchestrator processing system 704a and/or the PCIe configuration engine 706a in the FPGA device 706 to "spin up" an emulated device controller/emulated resource device for any resource device that is available (or that becomes available) to the orchestrator processing system 704a (e.g., via composition of a LCS via those resource devices by the resource management system 304 as discussed above), and then "destroy" that emulated device controller/emulated resource device for any resource device that becomes unavailable to the orchestrator processing system 704a. For example, as discussed above, the physical resource devices 716 and 718 may be under the control of the orchestrator processing system 704a, and the orchestrator processing system 704a may present a dynamic resource device inventory to the FPGA device 706 that identifies any resource devices that are currently available to the orchestrator processing system 704a, with the FPGA device 706 and/or orchestrator device 704a then operating to perform the memory system programming operations discussed above to create the emulated resource devices and emulated device controllers for the resource devices in that resource device inventory.

Figure 11:
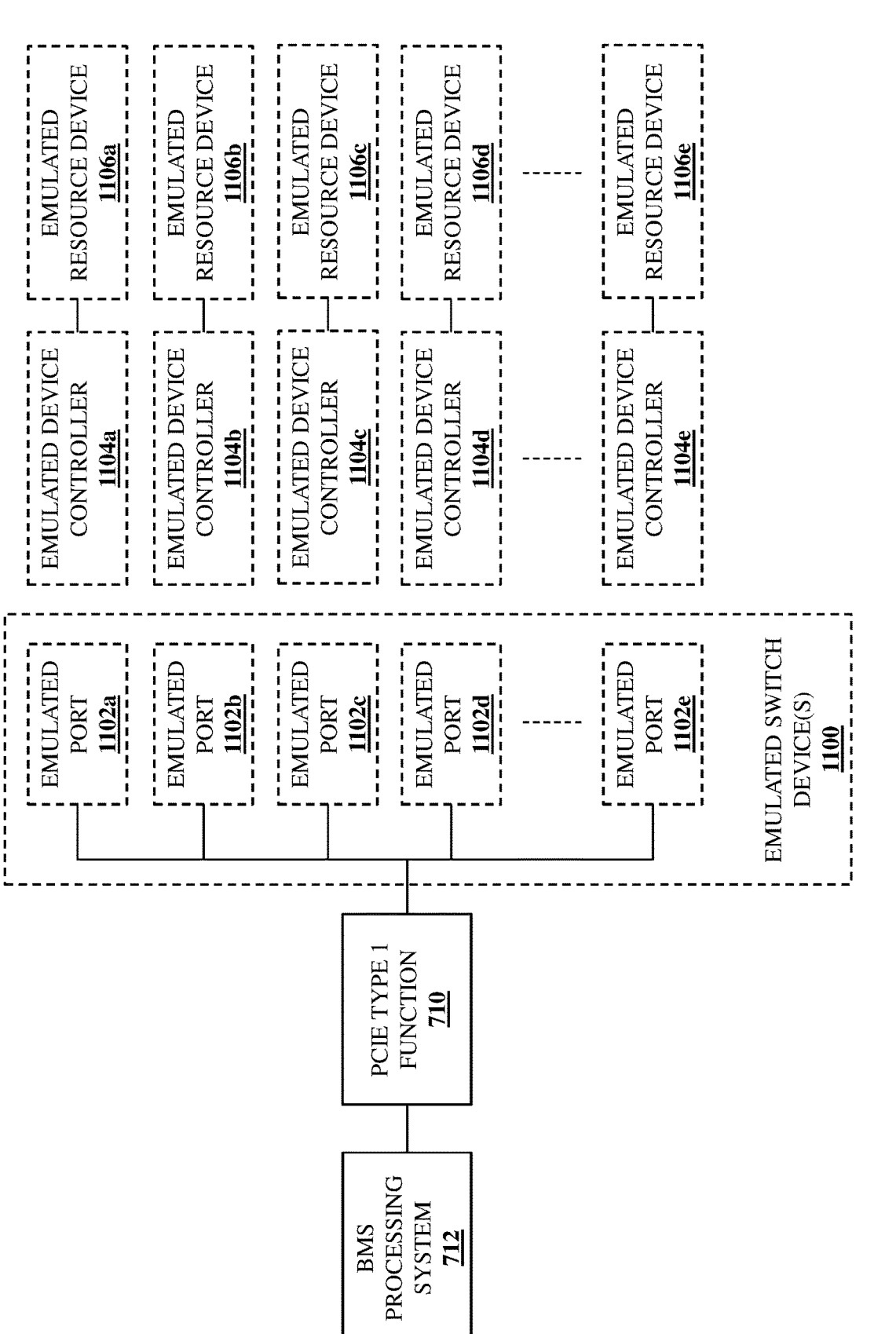
FIG. 11 is a schematic view illustrating an embodiment of the LCS resource device presentation and utilization system of FIG. 7 operating during the method of FIG. 8.

The method 800 then proceeds to block 808 where the orchestrator device presents emulated switch device(s) with emulated ports to a processing system, and emulates hot plug events for an operating system between the emulated resource devices and the emulated ports on the emulated switch device(s). With reference to FIG. 11, in an embodiment of block 808, the PCIe configuration engine 706a in the FPGA device 706 may present one or more emulated switch devices 1100 including a plurality of emulated switch downstream ports 1102a, 1102b, 1102c, 1102d, and up to 1102e to the BMS processing system 712 via the PCIe type 1 function 710. As will be appreciated by one of skill in the art in possession of the present disclosure, the PCIe type 1 function 710 may be used to present the emulated switch device(s) 1100 as a single emulated switch device or "bridge", or a hierarchy of emulated switch devices or "bridges", with the emulated switch downstream ports 1102a-1102e on those emulated switch device(s) 1100 enabling the presentation of many more PCIe functions to the BMS processing system 712 than are available using a conventional hardware-presented-PCIe-function system.

Furthermore, FIG. 11 illustrates how the orchestrator processing system 704a may have utilized the programming of the orchestrator memory system 714 at blocks 804 and 806 in order to emulate emulated device controllers 1104a, 1104b, 1104c, 1104d, and up to 1104e, as well as emulated resource devices 1106a, 1106b, 1106c, 1106d, and up to 1106e. As will be appreciated by one of skill in the art in possession of the present disclosure, the orchestrator processing system 704a and/or the PCIe configuration engine 706a in the FPGA device 706 may map each PCIe physical or virtual function that provides an emulated resource device/emulated device controller to its corresponding resource device by mapping that PCIe physical or virtual function to configuration space that was programmed in the orchestrator memory system 714 for that resource device, memory space that was programming in the orchestrator memory system 714 for that resource device, and/or any other portion of the memory system 714 that was programmed to provide that PCIe function/emulated resource device/emulated device controller for that resource device. Furthermore, one of skill in the art in possession of the present disclosure will appreciate how the orchestrator processing system 704a may program the orchestrator memory system 714 with topology information that describes the emulated switch device/emulated port/emulated device controller/emulated resource device emulated switch device(s), emulated ports, emulated device controllers, and/or emulated resource devices in the hierarchy that is presented to the BMS processing system 712.

As such, one of skill in the art in possession of the present disclosure will appreciate how the number of emulated switch devices 1100, emulated switch downstream ports 1102a-1102e, emulated device controllers 1104a-1104e, and emulated resource devices 1106a-1106e may be modified dynamically and without regard to hardware limitations other than the size of the orchestrator memory system 714 used to emulate the emulated device controllers 1104a-1104e and emulated resource devices 1106a-1106e. In an embodiment, the PCIe configuration engine 706a may include state machine and/or software that operates to present the emulated switch device(s) 1100 to the BMS processing system 712, and thus one of skill in the art in possession of the present disclosure will appreciate how the presentation of the emulated switch device(s) 1100 to the BMS processing system 712 will utilize a relatively low amount of FPGA resources (e.g., requiring only software and state machines), even when expanded to present a number of emulated resource devices/emulated device controllers/PCIe virtual functions up to the limits of the orchestrator memory system 714. Furthermore, one of skill in the art in possession of the present disclosure will appreciate how the emulated switch downstream ports describe here provide for the emulation of the hot plug events and hot removal events discussed herein, and may be the only technique available for doing so for some emulated resource devices while not disturbing the operations of other emulated resource devices. As such, a new LCS may be created (e.g., "spun up") on a BMS system while other LCSs are currently running on that BMS system. One of skill in the art in possession of the present disclosure will recognize how conventional systems with a Type 0 PCIe connection are only able to emulate hot plug events or hot removal events (which occur at a port level) for an entire device (i.e., all PCIe functions provided via that device).

Figure 12:
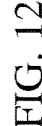
FIG. 12 is a schematic view illustrating an embodiment of the LCS resource device presentation and utilization system of FIG. 7 operating during the method of FIG. 8.
Figure 13:
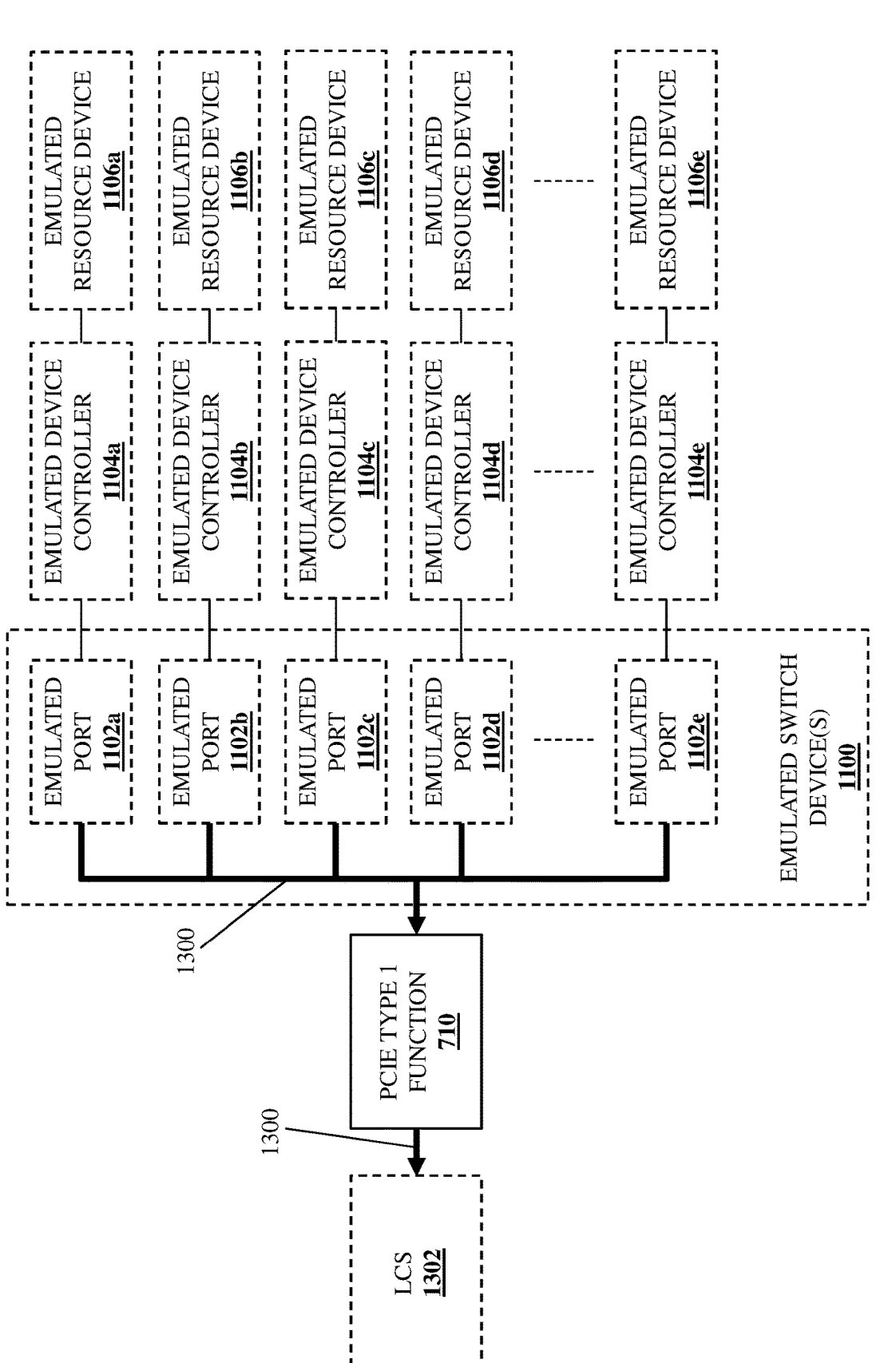
FIG. 13 is a schematic view illustrating an embodiment of the LCS resource device presentation and utilization system of FIG. 7 operating during the method of FIG. 8.

The orchestrator device may then emulate hot plug events for an operating system provided for the LCS and between the emulated resource devices and the emulated ports on the one or more emulated switch devices presented to the operating system. With reference to FIGS. 12 and 13, in an embodiment of block 808, the PCIe configuration engine 706a in the FPGA device 706 may perform hot plug event emulation operations 1300 that include emulating hot plug events for an operating system of an LCS 1302 provided by the BMS processing system 712, with the emulated hot plug events occurring between the LCS 1302 and the respective emulated switch downstream ports on the emulated switch device(s) presented to the operating system of the LCS 1302. As will be appreciated by one of skill in the art in possession of the present disclosure, the hot plug events described herein may originate at the emulated switch downstream ports, and may flow up to the BMS system through the PCIe type 1 function 710.

As will be appreciated by one of skill in the art in possession of the present disclosure, the emulated hot plug events performed at block 808 may emulate to the operating system the connection of a physical device to a physical port, hot plug handshaking operations, and/or any other hot plug operations known in the art (e.g., hot plug events as defined in the PCIe specification). For example, FIG. 13 illustrates how the hot plug event emulation operations 1300 include emulating a hot plug event for an operating system of the LCS 1302 provided by the BMS processing system 712, with that emulated hot plug event occurring between the LCS 1302 and the emulated switch downstream port 1102a on the emulated switch device(s) 1100 presented to the operating system of the LCS 1302 via the PCIe type 1 function 710.

Similarly, FIG. 13 illustrates how the hot plug event emulation operations 1300 include emulating a hot plug event for an operating system of the LCS 1302 provided by the BMS processing system 712, with that emulated hot plug event occurring between the LCS 1302 and the emulated switch downstream port 1102b on the emulated switch device(s) 1100 presented to the operating system of the LCS 1302 via the PCIe type 1 function 710, the emulated switch downstream port 1102c on the emulated switch device(s) 1100 presented to the operating system of the LCS 1302 via the PCIe type 1 function 710, the emulated switch downstream port 1102d on the emulated switch device(s) 1100 presented to the operating system of the LCS 1302 via the PCIe type 1 function 710, and the emulated switch downstream port 1102e on the emulated switch device(s) 1100 presented to the operating system of the LCS 1302 via the PCIe type 1 function 710. However, while particular emulated resource devices provided for particular resource devices 716 and 718 are illustrated and described as having a hot plug event emulated by their respective emulated ports, one of skill in the art in possession of the present disclosure will appreciate how any emulated resource device provided for any of the subset of the resource devices 716 and 718 that will provide the LCS 1302 may have a hot plug event emulated for it by its corresponding emulated port while remaining within the scope of the present disclosure as well.

As will be appreciated by one of skill in the art in possession of the present disclosure, following the emulation of the hot plug events, the operating system for the LCS 1302 provided by the BMS processing system 712 may interact with the emulated resource devices 1106a, 1106b, 1106c, 1106d, and 1106e in order to use the subset of resource devices 716 and 718 that provide the LCS 1302 in substantially the same manner as discussed above. For example, the operating system for the LCS 1302 may transmit resource device instructions to any of the emulated resource devices 1106a, 1106b, 1106c, 1106d, and 1106e, and those resource device instructions will be received by the orchestrator processing system 704a. As discussed above, the orchestrator processing system 704a may use the emulated device controllers 1104a, 1104b, and 1104e and the configuration information stored in each the memory system 714 to provide the emulated resource devices 1106a, 1106b, and 1106e, and in response to receiving the resource device instructions, may operate to cause the subset of resource devices 716 and 718 that are providing the LCS 1302 to perform operations for the LCS 1302 provided by the BMS processing system 712.

To provide a specific example using an emulated NVMe resource device, emulating control registers (both in the configuration space and the memory space discussed above) may include a Field Programmable Gate Array (FPGA) device mapping read and write accesses received from the BMS system to a location in the memory system 714 based on which emulated function is being accessed. As such, the FPGA device may be programmed with a base offset in the orchestrator memory system 714 for each of those functions, and software executed by the orchestrator processing system 704a may be responsible for emulating control register behavior for the type of device being presented (by manipulating values in the memory system 714). Furthermore, emulating the DMA transfers discussed above may include utilizing general-purpose DMA controllers within the FPGA device, and while those DMA controllers would not be exposed to the BMS system, they may be utilized via the execution of software by the orchestrator processing system 704a as needed.

In another specific example using an emulated NVMe resource device, software executed by the BMS processing system may create a new NVMe command along with associated data in its BMS memory system, then write a value to a doorbell register in the orchestrator memory system 714. Software executed by the orchestrator processing system 704a would then monitor the doorbell register provided in the memory system 714 and identify when a DMA transfer has been requested. Software executed by the orchestrator processing system 704a would then program the general-purpose DMA controller to copy the NVMe command and data to memory on the orchestrator device 704. As will be appreciated by one of skill in the art in possession of the present disclosure, to the BMS processing system 712 these DMA transfers would appear as being initiated by the presented NVMe function (e.g., using an appropriate PCIe RequesterID so that the transfers are handled the BMS IOMMU properly). As would be appreciated by one of skill in the art in possession of the present disclosure, the emulated devices described herein do not need to be provided by the same type of physical device. For example, while the emulated NVMe storage device discussed above may be provided using one or more physical NVMe storage devices, they may also be provided using other types of storage devices, including non-NVMe storage devices such as, for example, Hard Disk Drive (HDD) storage devices. Furthermore, any emulated device may be provided using software executed by the orchestrator processing system in the orchestrator device. As such, the physical device(s) supporting the emulated devices described herein need not be the same type of device as the emulated devices as long as they provide similar functionality.

The interrupts (e.g., the MSI interrupts discussed above) provided to the BMS processing system 712 may be handled similarly to the DMA transfers discussed above. For example, software executed by the orchestrator processing system 704a may be responsible for providing interrupts as necessary to emulate the type of device being presented (e.g., again using the correct PCIe RequesterID so that the interrupt appears to the BMS processing system 712 as coming from the presented function). As such, an emulated NVMe storage device may be presented to a BMS processing system/LCS, with NVMe commands and data transferred between a BMS memory system and orchestrator memory system, and the LCS believing that it is communicating with the emulated NVMe storage device and receiving interrupts from that emulated NVMe storage device using the techniques discussed above. As will be appreciated by one of skill in the art in possession of the present disclosure, the resource devices 716 and 718 used to provide that emulated NVMe storage device may have mapping maintained by the orchestrator processing system 704a for each presented emulated NVMe storage device to the resource devices providing it in order to allow for the storage of data in a non-volatile manner. As will be appreciated by one of skill in the art in possession of the present disclosure, the orchestrator processing system 704a may utilize any protocols necessary to move data between orchestrator device memory and the "back end" physical resource device providing the emulated resource device (e.g., the physical resource device may be supplied by a network attached appliance that uses a protocol other than NVMe (such as NVMeOF or a proprietary protocol on top of TCP/IP).

Furthermore, one of skill in the art in possession of the present disclosure will appreciate how, at or following block 808, the BMS processing system 712 may "see" one or more connected switch devices (i.e., the emulated switch device(s) 1100 connected to the PCIe type 1 function 710) that are further connected to resource devices (i.e., the emulated resource devices 1106a-1106e) via their device controllers (i.e., the emulated device controllers 1104a-1104e) and respective ports (i.e., the emulated switch downstream ports 1102a-1102e) on those connected switch devices. As will be appreciated by one of skill in the art in possession of the present disclosure, following block 808 of the method 800, the emulated resource devices/device controllers will be visible to the BMS processing system 712, while the hot plug events may cause the BMS processing system 712 to enumerate those emulated resource devices/device controllers. As such, the emulated hot plug events provide, subsequent to the initialization of the BMS system and the provisioning of one or more LCS using that BMS system such that it has already enumerated a PCIe hierarchy, for the ability to dynamically added new resource device(s) for new LCSs that will be provided by the BMS system. Thus, following the emulation of any resource device that is available to the orchestrator processing system 704a, at block 808 the BMS processing system 712 may be presented with a PCIe virtual function for that resource device that appears to be connected to an emulated port on an emulated switch device connected to the BMS processing system 712.

Furthermore, while illustrated and described as emulated "switch device(s)", one of skill in the art in possession of the present disclosure will appreciate that no actual PCIe switch resources may be needed for the emulated switch device(s) 1100, and the emulated switch device(s) 1100 need not provide "complete" switch device functionality. Rather, the emulated switch device(s) 1100 described herein may be provided via the utilization of Memory Mapped Input/Output (MMIO) operations, Direct Memory Access (DMA) operations, Message Signaled Interrupt (MSI) operations, and/or other operations that provide a single path between the BMS processing system 712 and any one of the emulated resource devices/PCIe functions.

Figure 14:
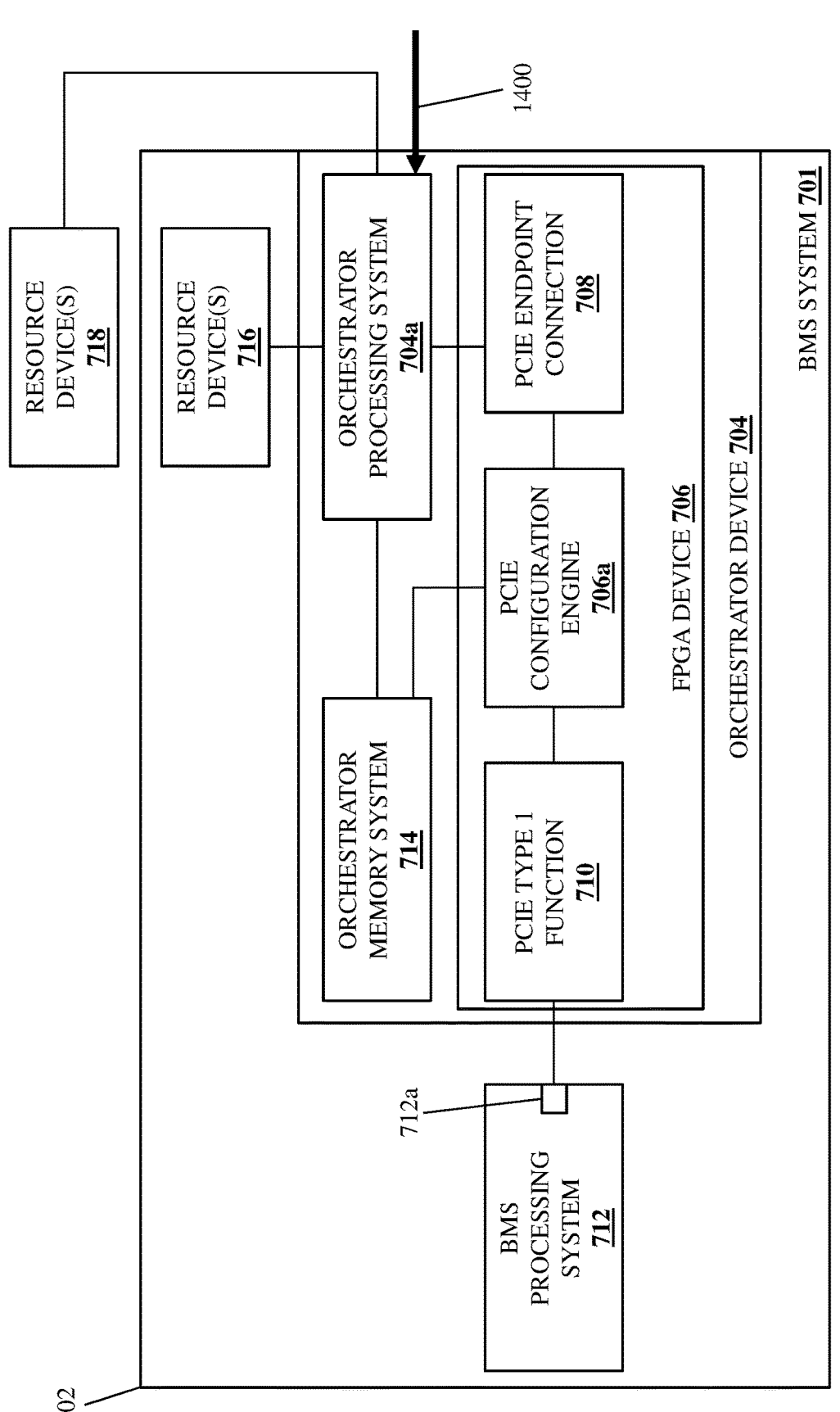
FIG. 14 is a schematic view illustrating an embodiment of the LCS resource device presentation and utilization system of FIG. 7 operating during the method of FIG. 8.

The method 800 then proceeds to block 810 where the orchestrator device receives an instruction to stop providing the LCS using the subset of the resource devices. With reference to FIG. 14, in an embodiment of block 810, the orchestrator processing system 704a may perform LCS stop provisioning instruction receiving operations 1400 that include receiving an LCS stop provisioning instruction that instructs the orchestrator processing system 704a to stop providing the LCS 1302 using a subset of the resource devices 716 and 718. For example, as discussed above, the client device 202 may complete the workload for which the LCS 1302 was provided and, in response, the resource management system 304 (e.g., an SCPM device) may decompose the LCS 1302 that was provided using the subset of the resource devices 716 and 718, and then may generate and transmit the LCS stop provisioning instruction that instructs the orchestrator processing system 704a to stop providing the LCS 1302 using that subset of the resource devices 716 and 718.

Figure 15:
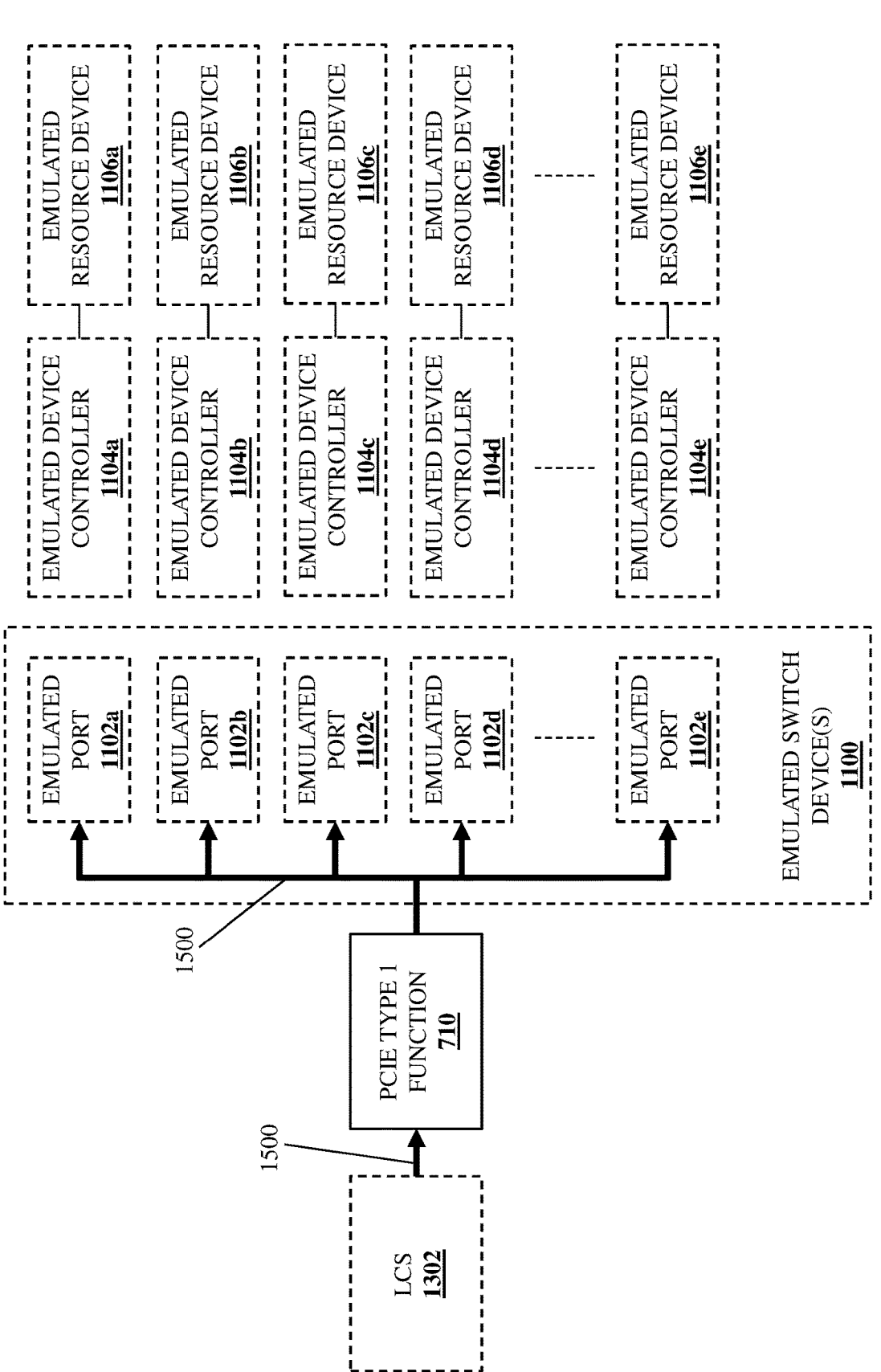
FIG. 15 is a schematic view illustrating an embodiment of the LCS resource device presentation and utilization system of FIG. 7 operating during the method of FIG. 8.

The method 800 then proceeds to block 812 where the orchestrator device emulates hot removal events for the operating system provided for the LCS and between the LCS and the emulated ports on the one or more emulated switch devices presented to the operating system. With reference to FIG. 15, in an embodiment of block 812, the orchestrator processing system 704a may instruct the PCIe configuration engine 706a in the FPGA device 706 to perform hot removal event emulation and, in response, the PCIe configuration engine 706a may perform hot removal event emulation operations 1500 that include emulating hot removal events for the operating system of the LCS 1302 provided by the BMS processing system 712, with those hot removal events occurring between the LCS 1302 and the respective emulated ports on the emulated switch device(s) presented to the operating system of the LCS 1302. As will be appreciated by one of skill in the art in possession of the present disclosure, the emulated hot removal events performed at block 812 may emulate to the operating system the disconnection of a physical device from a physical port, and/or any other hot removal operations known in the art (e.g., hot removal events as described in the PCIe specification). For example, FIG. 15 illustrates how the hot removal event emulation operations 1500 include emulating a hot removal event for an operating system of the LCS 1302 provided by the BMS processing system 712, with that hot removal event occurring between the LCS 1302 and the emulated switch downstream port 1102a on the emulated switch device(s) 1100 presented to the operating system of the LCS 1302 via the PCIe type 1 function 710.

Similarly, FIG. 15 illustrates how the hot removal event emulation operations 1500 include emulating a hot removal event for an operating system of the LCS 1302 provided by the BMS processing system 712, with that hot removal event occurring between the LCS 1302 and the emulated switch downstream port 1102*b* on the emulated switch device(s) 1100 presented to the operating system of the LCS 1302 via the PCIe type 1 function 710, between the LCS 1302 and the emulated switch downstream port 1102*c* on the emulated switch device(s) 1100 presented to the operating system of the LCS 1302 via the PCIe type 1 function 710, between the LCS 1302 and the emulated switch downstream port 1102*d* on the emulated switch device(s) 1100 presented to the operating system of the LCS 1302 via the PCIe type 1 function 710, and between the LCS 1302 and the emulated switch downstream port 1102*e* on the emulated switch device(s) 1100 presented to the operating system of the LCS 1302 via the PCIe type 1 function 710. However, while particular emulated resource devices provided for particular resource devices 716 and 718 are illustrated and described as having a hot removal event emulated between and the LCS 1302 and their respective emulated ports, one of skill in the art in possession of the present disclosure will appreciate how any emulated resource device provided for a subset of the resource devices 716 and 718 that provide the LCS 1302 may have a hot removal event emulated between the LCS 1302 and its corresponding emulated port while remaining within the scope of the present disclosure as well. Following the completion of the hot removal event emulation operations 1500, the PCIe configuration engine 706*a* in the FPGA device 706 may acknowledge the instruction to perform hot removal event emulation to the orchestrator processing system 704*a*.

Figure 16:
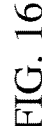
FIG. 16 is a schematic view illustrating an embodiment of the LCS resource device presentation and utilization system of FIG. 7 operating during the method of FIG. 8.

With reference to FIG. 16, in some embodiments of block 816 and in response to emulating the hot removal events, the orchestrator processing system 704*a* and/or the PCIe configuration engine 706*a* in the FPGA device 706 may perform memory system de-programming operations 1600 that may include de-programming the configuration information from the orchestrator memory system 714 for the subset of resource devices 716 and 718 that provided emulated resource devices 1106*a*, 1106*b*, and 1106*e* for those resource devices 716 and 718. For example, the memory system de-programming operations 1600 may include de-programming the PCIe configuration information such as device configuration register information, Memory Mapped Input/Output (MMIO) register information, control register information, capability information, and/or any other configuration information from the orchestrator memory system 714 for each of the subset of resource devices 716 and 718 that allowed for the emulation of the emulated resource devices 1106*a*, 1106*b*, and 1106*e* discussed above. Furthermore, the memory system de-programming operations 1600 may also include the storage of deprogramming information in the orchestrator memory system 714 related to the emulated switch devices/ports in the portion of the emulated hierarchy discussed above for associated devices. As will be appreciated by one of skill in the art in possession of the present disclosure, the resource management system 304 may manage the resource devices 716 and 718 that are specific to the LCS 1302, an thus the "destroying" of that LCS 1302 by the resource management system 304 may cause orchestrator processing system 704*a* to return those resource devices 716 and 718 to an available pool of resource devices that may be used by the resource management system 304 to compose other LCSs.

Thus, systems and methods have been described that provide a software/hardware architecture that programs a memory system to emulate resource devices and their corresponding device controllers. Those emulated resource devices are then presented to a processing system as PCIe functions connected to emulated ports on emulated switch device(s). When an LCS is composed from a subset of the resource devices using that orchestrator device, the systems and methods of the present disclosure may then emulate hot plug events to an operating system for that LCS that is provided by the processing system, with those emulated hot-plug events occurring between the emulated resource devices for that subset of resource device and their respective emulated ports on the emulated switch device(s) in order to allow the operating system to utilize the subset of resource devices in order to perform operations for the LCS. When the LCS is subsequently de-composed, the systems and methods of the present disclosure may then emulate hot removal events to that operating system and between the emulated resource devices for the subset of resource device and their respective emulated ports on the emulated switch device(s). As such, emulated resource devices may be created and presented to a processing system for any resource device available to an orchestrator device, and then utilized by an operating system provided by that processing system for an LCS, without a need to dedicate hardware for each PCIe function representing those resource devices.

As such, the systems and methods of the present disclosure provide for the separation of PCIe physical/virtual function presentation from fixed hardware resources per function, and in doing so create a scalable system for presenting and utilizing resource devices with an LCS in a manner that is limited only by the space available in any attached memory systems. As will be appreciated by one of skill in the art in possession of the present disclosure, the orchestrator device may have total control over any capabilities presented for the emulated resource devices/PCIe functions to the LCS, and may be configured to present groups of emulated resource devices/PCIe functions (e.g., similar types of emulated resource devices/PCIe functions) that consume desired amounts of memory system space (e.g., that each require the same or similar number of bits per PCIe function). One of skill in the art in possession of the present disclosure will appreciate how the PCIe function presentation discussed above that provides the emulated resource devices may be independent of the emulated device controllers provided for the emulated resource devices, and thus multiple orchestrator devices or orchestrator device groups may share a common PCIe function/emulated resource device mapping to a BMS processing system. Furthermore, emulated device controllers may be created and destroyed in software run by the orchestrator processing system, with the emulated device controller configuration space located in a memory system attached to the orchestrator processing system, thus supporting relatively simple creation and destruction of any controller types, as well as the presentation of BMS-system-manufacturer-specific PCIe virtual function types to the BMS processing system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) resource device utilization system, comprising:

a Bare Metal Server (BMS) system including:

a BMS processing system; and a BMS memory system;

a plurality of resource devices, wherein some of the plurality of resource devices are included in the BMS system, and some of the plurality of resource devices are coupled to the BMS system via a network; and an orchestrator device that is coupled between the BMS processing system and the plurality of resource devices and that includes a Peripheral Component Interconnect express (PCIe) type 1 function connected to a root port on the BMS processing system, wherein the orchestrator device is configured to:

receive a Logically Composed System (LCS) provisioning instruction to provide an LCS using a subset of the plurality of resource devices that includes at least one of the plurality of resource devices that are included in the BMS system, and at least one of the plurality of resource devices that are coupled to the BMS system via the network;

program, for each of the subset of the plurality of resource devices, an orchestrator memory system in the orchestrator device with respective configuration information for that resource device that provides a respective emulated resource device for that resource device and that includes:

emulated resource device registers that are configured for use in emulating operation of that resource device to the processing system; and emulated resource device mapping information that maps that respective emulated resource device to that resource device;

provide, for each respective emulated resource device, a respective PCIe virtual function;

emulate, using the PCIe type 1 function, at least one emulated switch device including a plurality of emulated ports to an operating system provided for the LCS using the BMS processing system and the BMS memory system in the BMS system;

emulate, for each of the subset of the plurality of resource devices, a respective hot plug event for the operating system, wherein each respective hot plug event occurs between the PCIe virtual function provided for that respective emulated resource device and a respective one of the plurality of emulated ports on the at least one emulated switch device;

receive an LCS stop provisioning instruction to stop providing the LCS; and emulate, for each of the subset of the plurality of resource devices in response to receiving the LCS stop provisioning instruction, a respective hot removal event for the operating system, wherein each respective hot removal event occurs between the PCIe virtual function provided for that respective emulated resource device and the respective one of the plurality of emulated ports on the at least one emulated switch device.

2. The system of claim 1, wherein the orchestrator device is configured to:

enable, for each respective emulated resource device provided for the plurality of resource devices, interrupts to the BMS processing system in the BMS system.

3. The system of claim 1, wherein the orchestrator device is configured to:

remove, in response to receiving the LCS stop provisioning instruction, the configuration information that was programmed in the orchestrator memory system.

4. The system of claim 1, further comprising:

one of a Field Programmable Gate Array (FPGA) device or an Application Programmable Integrated Circuit (ASIC) that is included in the orchestrator device and that provides the PCIe type 1 function.

5. The system of claim 1, further comprising:

a PCIe endpoint connection included in one of the FPGA device or the ASIC that is configured to present the one of the FPGA device or the ASIC to an orchestrator processing system in the orchestrator device as a PCIe endpoint.

6. The system of claim 1, wherein at least one of the subset of the plurality of resource devices is included in a chassis with the orchestrator device, and wherein at least one of the subset of the plurality of resource devices is located outside of the chassis and coupled to the orchestrator device via a network.

7. The system of claim 1, wherein the respective PCIe virtual function provided for each respective emulated resource device is provided without dedicated processing resources.

8. An Information Handling System (IHS), comprising:

an orchestrator processing system that is coupled between a Bare Metal Server (BMS) processing system in a BMS system and a plurality of resource devices, wherein some of the plurality of resource devices are included in the BMS system, and some of the plurality of resource devices are coupled to the BMS system via a network; and an orchestrator memory system that is coupled to the orchestrator processing system and that includes instructions that, when executed by the orchestrator processing system, cause the orchestrator processing system to provide an orchestrator engine that is configured to:

receive a Logically Composed System (LCS) provisioning instruction to provide an LCS using a subset of a plurality of resource devices that includes at least one of the plurality of resource devices that are included in the BMS system, and at least one of the plurality of resource devices that are coupled to the BMS system via the network;

program, for each of the subset of the plurality of resource devices, the orchestrator memory system with respective configuration information for that resource device that provides a respective emulated resource device for that resource device and that includes:

emulated resource device registers that are configured for use in emulating operation of that resource device to the processing system; and emulated resource device mapping information that maps that respective emulated resource device to that resource device;

provide, for each respective emulated resource device, a respective PCIe virtual function;

emulate, using a PCIe type 1 function that is coupled to the orchestrator processing system and that is connected to a root port on the BMS processing system, at least one emulated switch device including a plurality of emulated ports to an operating system provided for the LCS using the BMS processing system and the BMS memory system in the BMS system;

emulate, for each of the subset of the plurality of resource devices, a respective hot plug event for the operating system, wherein each respective hot plug event occurs between the PCIe virtual function provided for that respective emulated resource device and a respective one of the plurality of emulated ports on the at least one emulated switch device;

receive an LCS stop provisioning instruction to stop providing the LCS; and emulate, for each of the subset of the plurality of resource devices in response to receiving the LCS stop provisioning instruction, a respective hot removal event for the operating system, wherein each respective hot removal event occurs between the PCIe virtual function provided for that respective emulated resource device and the respective one of the plurality of emulated ports on the at least one emulated switch device.

9. The IHS of claim 8, wherein the orchestrator engine is configured to:

enable, for each respective emulated resource device provided for the plurality of resource devices, interrupts to the BMS processing system in the BMS system.

10. The IHS of claim 8, wherein the orchestrator engine is configured to:

remove, in response to receiving the LCS stop provisioning instruction, the configuration information that was programmed in the orchestrator memory system.

11. The IHS of claim 8, further comprising:

one of a Field Programmable Gate Array (FPGA) device or an Application Programmable Integrated Circuit (ASIC) that is coupled to the orchestrator processing system and that provides the PCIe type 1 function.

12. The IHS of claim 8, wherein at least one of the subset of the plurality of resource devices is included in a chassis with the orchestrator processing system, and wherein at least one of the subset of the plurality of resource devices is located outside of the chassis and coupled to the orchestrator processing system via a network.

13. The IHS of claim 8, wherein the respective PCIe virtual function provided for each respective emulated resource device is provided without dedicated processing resources.

14. A method for utilization resource devices with a Logically Composed System (LCS), comprising:

receiving, by an orchestrator device that is coupled between a Bare Metal Server (BMS) processing system in a BMS system and a plurality of resource devices, a Logically Composed System (LCS) provisioning instruction to provide an LCS using a subset of the plurality of resource devices that includes at least one of the plurality of resource devices that is included in the BMS system, and at least one of the plurality of resource devices that is coupled to the BMS system via a network;

programming, by the orchestrator device for each of the subset of the plurality of resource devices, an orchestrator memory system in the orchestrator device with respective configuration information for that resource device that provides a respective emulated resource device for that resource devices and that includes:

emulated resource device registers that are configured for use in emulating operation of that resource device to the processing system; and emulated resource device mapping information that maps that respective emulated resource device to that resource device;

providing, by the orchestrator device for each respective emulated resource device, a respective PCIe virtual function;

emulating, by the orchestrator device using a PCIe type 1 function that is connected to a root port on the BMS processing system, at least one emulated switch device including a plurality of emulated ports to an operating system provided for the LCS using the BMS processing system and the BMS memory system in the BMS system;

emulating, by the orchestrator device for each of the subset of the plurality of resource devices, a respective hot plug event for the operating system, wherein each respective hot plug event occurs between the PCIe virtual function provided for that respective emulated resource device and a respective one of the plurality of emulated ports on the at least one emulated switch device;

receiving, by the orchestrator device, an LCS stop provisioning instruction to stop providing the LCS; and emulating, by the orchestrator device for each of the subset of the plurality of resource devices in response to receiving the LCS stop provisioning instruction, a respective hot removal event for the operating system, wherein each respective hot removal event occurs between the PCIe virtual function provided for that respective emulated resource device and the respective one of the plurality of emulated ports on the at least one emulated switch device.

15. The method of claim 14, further comprising:

enabling, by the orchestrator device for each respective emulated resource device provided for the plurality of resource devices, interrupts to the BMS processing system in the BMS system.

16. The method of claim 14, further comprising:

removing, by the orchestrator device in response to receiving the LCS stop provisioning instruction, the configuration information from-that was programmed in the orchestrator memory system.

17. The method of claim 14, further comprising:

providing, by one of a Field Programmable Gate Array (FPGA) device or an Application Programmable Integrated Circuit (ASIC) included in the orchestrator device, the PCIe type 1 function.

18. The method of claim 14, presenting, by a PCIe endpoint connection included in the one of the FPGA device or the ASIC included in the orchestrator device, the one of the FPGA device or the ASIC to an orchestrator processing system in the orchestrator device as a PCIe endpoint.

19. The method of claim 14, wherein at least one of the subset of the plurality of resource devices is included in a chassis with the orchestrator device, and wherein at least one of the subset of the plurality of resource devices is located outside of the chassis and coupled to the orchestrator device via a network.

20. The method of claim 14, wherein the respective PCIe virtual function provided for each respective emulated resource device is provided without dedicated processing resources.

* * * * *